United States Patent [19]

Kato et al.

[11] 4,415,535
[45] Nov. 15, 1983

[54] APPARATUS FOR REFINING METAL CARBIDES CONTAINING FREE CARBON

[75] Inventors: Kunio Kato, Kiryu; Yoshiki Sugiyama, Gifu; Ryo Enomoto, Ohgaki, all of Japan

[73] Assignee: Ibiden Co., Ltd., Gifu, Japan

[21] Appl. No.: 334,901

[22] Filed: Dec. 28, 1981

Related U.S. Application Data

[62] Division of Ser. No. 109,114, Jan. 2, 1980, Pat. No. 4,327,067.

[30] Foreign Application Priority Data

Jan. 18, 1979 [JP] Japan .................................. 54-3337

[51] Int. Cl.³ .................. C01B 31/36; C01B 31/30; C01B 31/34; B01J 8/32
[52] U.S. Cl. .................................. 422/143; 422/145; 422/146; 422/147; 423/345
[58] Field of Search ................ 422/143, 145, 146, 147

[56] References Cited

U.S. PATENT DOCUMENTS

| | | | |
|---|---|---|---|
| 2,952,617 | 9/1960 | Haig | 422/145 X |
| 3,233,981 | 2/1966 | Scott | 422/145 |
| 3,264,751 | 8/1966 | McEntee | 422/146 X |
| 4,135,885 | 1/1979 | Wormser et al. | 422/145 X |

FOREIGN PATENT DOCUMENTS

45-17903  6/1970  Japan .
1361402  7/1974  United Kingdom .

*Primary Examiner*—Barry S. Richman
*Attorney, Agent, or Firm*—Parkhurst & Oliff

[57] ABSTRACT

Metal carbide powders containing free carbon which have heretofore been difficult to refine can be refined excellently by charging the metal carbide powders in a fluidizing bed consisting of fluidized heat-resistant particles and having a temperature of a determined range to burn and remove the free carbon contained therein, and by subsequently discharging refined metal carbide powders and combustion gas from an upper part of the fluidizing bed for recovery of the refined metal carbide powders.

2 Claims, 3 Drawing Figures

APPARATUS FOR REFINING METAL CARBIDES CONTAINING FREE CARBON

This is a division of application Ser. No. 109,114 filed Jan. 2, 1980, now U.S. Pat. No. 4,327,067 issued Apr. 27, 1982.

BACKGROUND OF THE INVENTION

The present invention relates to a method and an apparatus for refining metal carbide containing free carbon, particularly to a method of burning and removing free carbon contained in a fine metal carbide powder such as powders of carbide of silicon, titanium, tantalum, niobium, tungsten, vanadium and the like and an apparatus used therefor.

Heretofore, metal carbide has been produced mainly by allowing carbon to react with a metal or a metal oxide. In a metal carbide produced by such a method, there are unavoidably mixed free carbon combined with the metal carbide. Therefore, a step of refining a metal carbide by removing free carbon has become an important process in producing a metal carbide.

For removing free carbon contained in a metal carbide, there have hitherto been known methods such as (a) gravity concentration method using the difference between specific gravities of a metal carbide and free carbon, (b) floatation method using the difference between affinities to air of a metal carbide and free carbon, and (c) burning method of removing free carbon using the difference between oxidation speeds of a metal carbide and free carbon. Among these methods, the gravity concentration method (a) has a disadvantage of requiring a prolonged time for separation unless the metal carbide has relatively coarse particles and the gravity difference is large. While, the floatation method (b) has been disclosed, for example, in Japanese Patent Application Publication No. 24,480/76, it has a disadvantage that the efficiency of separation decreases unless particle sizes of metal carbide to be treated are set in a relatively narrow range. Moreover, either the method (a) or (b) has a disadvantage that metal carbide and free carbon have to be preliminarily separated to their unit particles before being subjected to respective treatment. However, the burning method (c) of removing free carbon is capable of removing free carbon uniformly even when metal carbide to be treated is fine particles which are difficult to be preliminarily separated to unit particles of metal carbide and free carbon.

For the burning method of removing free carbon contained in a metal carbide, there can be conceived such methods as (1) a method of burning the free carbon contained in the metal carbide on a dish type container in a furnace, (2) a method of burning the free carbon contained in the metal carbide in a multi-stage furnace or a revolving furnace such as a rotary kiln and we conceived of (3) a method of burning the free carbon contained in the metal carbide under fluidization of the metal carbide. Among these methods, either the method (1) or (2) has drawbacks that efficiency of contacting free carbon with an oxidizing gas is low so that a prolonged time is necessary for burning and removing free carbon sufficiently, and that the loss of metal carbide due to oxidization thereof is large. Therefore, both the methods (1) and (2) have not been suitable methods for refining a great quantity of metal carbide. Meanwhile, we have found out that the method (3) of fluidizing metal carbide has extremely high efficiency of contacting metal carbide with an oxidizing gas, however, it has drawbacks in that fine metal carbide powders are liable to scatter unless the grain size of the metal carbide powders is set in a coarse range and that a uniform fluidizing state is scarcely obtained because of formation of agglomerated masses of the metal carbide powders due to the adhering property of formed oxides at surfaces of metal carbides during the burning process. Hence, it is not suited particularly to burning and removing of free carbon contained in fine metal carbide powders.

SUMMARY OF THE INVENTION

It is an object of the present invention to provide a method wherein the aforementioned disadvantages and drawbacks are essentially obviated or eliminated and fine metal carbide powders containing free carbon which have heretofore been difficult to refine by removing free carbon contained therein can be treated and refined in a large quantity with a high recovery efficiency in a short time without loss of metal carbide due to its oxidation by burning the removing the free carbon contained therein.

It is another object of the present invention to provide an apparatus for use in the practice of the refining method.

In accordance with the present invention, the above objects can be achieved.

The present invention provides a method of refining metal carbide powders containing free carbon which comprises, producing a fluidizing bed consisting of fluidized heat-resistant particles by means of an oxidizing gas, charging metal carbide powders finer than the heat-resistant particles from a lower part of the fluidizing bed, burning the free carbon during floating and rise of the metal carbide powders in the fluidizing bed at a temperature of 800–1,100° C., and subsequently scattering and discharging refined metal carbide powders and combustion gas from an upper part of the fluidizing bed for recovery of the refined metal carbide powders.

The present invention provides also an apparatus for refining metal carbide powders containing free carbon, comprising a sealed vessel for producing a fluidizing bed consisting of heat-resistant particles having an average particle diameter of 150–500μ fluidized by an oxidizing gas, an inlet for introducing the oxidizing gas arranged at the lower end of the sealed vessel, a gas distributor for dispensing the oxidizing gas in the fluidizing bed arranged at a lower part of the fluidizing bed, an inlet for charging the metal carbide powders located just above the gas distributor, a heating member for heating the fluidizing bed arranged in the refining apparatus to burn and remove the free carbon from the metal carbide powders, an outlet for discharging a mixture of refined metal carbide powders and combustion gas from the fluidizing bed arranged above the fluidizing bed, and a separator for recovering the refined metal carbide powders from the mixture discharged from the outlet.

DETAILED EXPLANATION OF THE INVENTION

Figure 1:
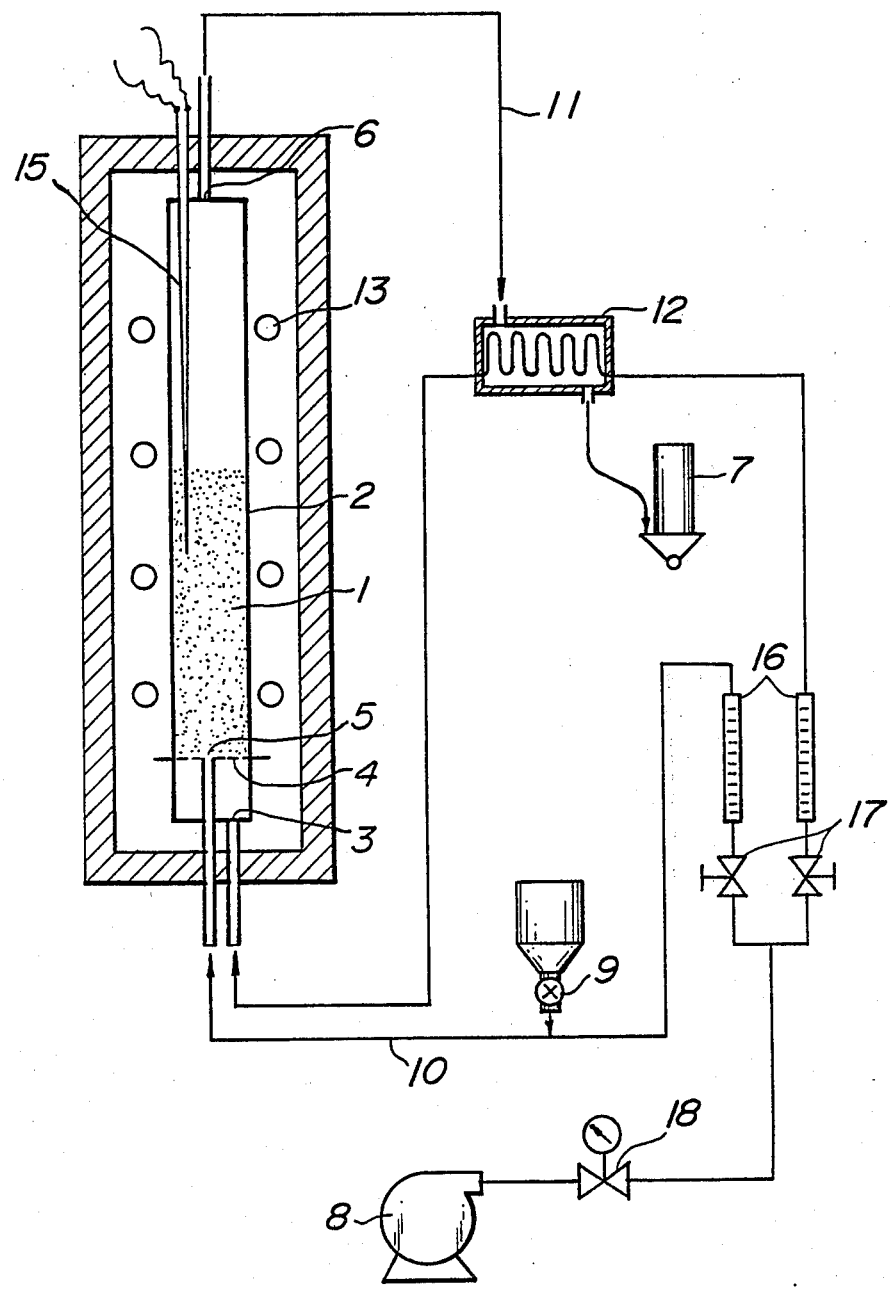
FIG. 1 is a diagrammatical graph illustrating an embodiment of a refining apparatus of the present invention used in Examples 1 and 2 which will later be described.

According to the present invention, metal carbides such as carbide of silicon, titanium, tantalum, niobium, tungsten, vanadium and the like can be refined satisfactorily, because they are resistive to oxidation at high temperature and their losses due to oxidation during the refining operation are small. Especially, silicon carbide can be refined advantageously, because it has superior oxidationresistive property and loss due to oxidation is extremely small.

It is important in the present invention that the metal carbide is in the form of sufficiently fine powders, because free carbon contained in metal carbide is burned while the metal carbide powders containing it are moved from a lower position in an upward direction by means of an oxidizing gas in a heat-resistant or refractory sealed vessel retained at a high temperature. Preferably, the average grain size of metal carbide powders containing free carbon is not over than $200\mu$. Metal carbide powders having an average grain size larger than $200\mu$ are difficult to float and move from a lower position to an upward position by an oxidizing gas, so that they are difficult to be discharged from the upper part of the sealed vessel for recovery and thus they accumulate gradually in the sealed vessel, making continuous operation of the process difficult.

In the present invention, it is essential that a fluidizing bed consisting of fluidized heat-resistant particles is formed in the refractory sealed vessel, so that free carbon contained in metal carbide powders is burned during floating and moving of the metal carbide powders with the aid of an oxidizing gas. By using a fluidizing bed consisting of fluidized heat-resistant particles, metal carbide powders containing free carbon can have a substantially uniform residence time in the sealed vessel and are kept from agglomeration due to formation of oxides at surface of the metal carbide powders in the sealed vessel. Therefore, the free carbon is efficiently contacted with the oxidizing gas, so that the free carbon contained in the metal carbide powders can be burned and removed quite efficiently.

The heat-resistant particles are used in an oxidizing atmosphere of high temperature range, so that they are preferably inorganic solid particles which do not melt and react with the metal carbide powders or the oxidizing gas. Illustrative of such particles are, for example, silica, alumina, mullite, magnesia, zirconia, zircon sand, silicon carbide and the like.

An average particle size of the heat-resistant particles constituting the fluidizing bed is preferably within a range of $150-500\mu$. When the average particle size of the heat-resistant particles is less than $150\mu$, the heat-resistant particles are discharged along with the oxidizing gas rising in the fluidizing bed from an outlet at an upper part of the sealed vessel and incorporated in the discharged metal carbide powders to lower the quality of the metal carbide powders. While, when the average particle size of the heat-resistant particles is over than $500\mu$, over-large bubbles are liable to be formed and a uniform fluidized state cannot be retained, so that the efficiency of contacting free carbon with the oxidizing gas is decreased.

It is necessary that the metal carbide powders be finer than the heat-resistant particles, because the metal carbide powdes are floated, scattered and separated from the fluidizing bed consisting of the fluidized heat-resistant particles.

A bed height a minimum fluidizing gas velocity is preferably within a range of 0.2–3.0 m. When the bed height is less than 0.2 m, the residence time of metal carbide powders in the fluidizing bed becomes uneven, so that incompletely or insufficiently burned free carbon is discharged. While, when the bed height is larger than 3.0 m, a residence time of the metal carbide powders in the fluidizing bed becomes unnecessarily long, so that consumption loss of metal carbide powders due to oxidation becomes large. Also, pressure loss of the oxidizing gas due to the heat-resistant particles becomes extremely large and the pressure of the incoming oxidizing gas has to be increased to overcome the pressure loss and hence the necessary blower-pressure capacity for introducing the oxidizing gas becomes uneconomically large.

If bubbles in the fluidizing bed become coarse by agglomeration in the case of burning free carbon in the fluidizing bed, the efficiency of contacting free carbon with the oxidizing gas decreases. Therefore, it is preferable to arrange in the fluidizing bed a bubble dispersing element such as a cylindrical net of stainless steel wire.

In order to minimize the loss of metal carbide powders due to the oxidation and to burn free carbon efficiently, it is necessary that the burning operation be effected at a temperature range of 800–1,100° C, which is higher than a reaction temperature generally used in a conventional burning method of removing free carbon. When the burning temperature or reaction temperature is lower than 800° C., the combustion rate of free carbon is slowed down and some free carbon is left unreacted, so that the efficiency of removing free carbon is decreased. While, when the reaction temperature is higher than 1,100° C., the product metal carbide powders are oxidized extremely rapidly, so that the loss of product becomes large and the quality of the product is also deteriorated.

According to the present invention, the reaction temperature should preferably be kept in the determined range for the reason mentioned above, therefore, for that purpose, it is satisfactory to control a temperature of the fluidizing bed. When the quantity of free carbon contained in the metal carbide powders is so minor that the reaction temperature of the fluidizing bed is scarcely maintained by mere combustion heat of the free carbon, an auxiliary heating member may additionally be used for heating the fluidizing bed. When controlling the temperature of the fluidizing bed or applying heat to the fluidizing bed by the auxiliary heating member, desirably a method is used wherein incorporation of impurities into the metal carbide powders is suppressed to a minimum extent. For example, an electrical indirect heating method, a heating method of using a fuel substantially free from ash or a method of preheating the oxidizing gas by a heat exchanger is advantageous.

In order to make the fluidizing bed burn and remove efficiently free carbon contained in the metal carbide powders, it is advantageous to set the superficial gas veolcity of the oxidizing gas at a determined range, preferably within a range of 5–100 cm/sec. When the superficial gas velocity is less than 5 cm/sec, the amount of refined metal carbide powders per unit of time is decreased, so that the refining efficiency is decreased and a uniformly fluidized state of the heat-resistant particles is hardly attained. The metal carbide powders are barely lifted by the oxidizing gas in the fluidizing bed and hardly discharged from the outlet. Thus the metal carbide powders are accumulated in the fluidizing bed, thereby making the continuous operation of the process impossible. While, when the superficial gas velocity is larger than 100 cm/sec, the residence time of the metal carbide powders in the fluidizing bed becomes so small that the efficiency of removing free carbon decreases. The heat-resistant particles are scattered and discharged from the outlet by the oxidizing gas and introduced as impurities into the product refined metal carbide powders thereby lowering the quality of the refined product. Particularly, a superficial gas velocity of 10-40 cm/sec is preferable.

For an oxidizing gas, air can advantageously be used to oxidize and remove free carbon sufficiently. Alternatively, air enriched with oxygen can successfully be used, as the case may be.

Products of conventional fluidizing bed are generally discharged from a lower part of the fluidizing bed, whereas, according to the present invention, the metal carbide powders are discharged together with the combustion gas from an upper part of the fluidizing bed and recovered. This is because the burning reaction of free carbon is effected by causing the extremely fine metal carbide powders and free carbon to rise by means of the oxidizing gas in the fluidizing bed consisting of fluidized heat-resistant particles so that the metal carbide powders exist in the rising combustion gas stream, and hence the metal carbide powders are quite easily and efficiently separated and recovered from the heat-resistant particles by discharging a mixture of the metal carbide powders and the combustion gas from an upper part of the fluidizing bed and subsequently separating the powders from the mixture by a separator.

Once refined metal carbide powders can further be subjected to a similar treatment and/or the above gravitation method or floatation method to further remove free carbon for further refining the metal carbide powders.

According to the apparatus of the present invention, metal carbide powders containing free carbon are charged from the inlet for charging metal carbide powders arranged above the gas distributor in the sealed vessel. Free carbon contained in the metal carbide powders is burned and removed during the rise of the metal carbide powders in the fluidizing bed consisting of the fluidized heat-resistant particles, and refined metal carbide powders are floated and scattered from the fluidizing bed and discharged together with the combustion gas from the outlet arranged at an upper part of the fluidizing bed and then enter into the separator for recovery.

DESCRIPTION OF THE PREFERRED EMBODIMENTS

Hereinafter, the present invention will be explained in more detail with reference to the preferred embodiments shown in the appended drawings.

Referring to FIG. 1, the apparatus of the present invention is provided with a fluidizing bed 1 consisting of fluidized heat-resistant particles inside of a refractory sealed vessel 2, an inlet 3 for supplying an oxidizing gas located at the lower end of the sealed vessel 2, a gas distributing plate 4 for dispensing the supplied oxidizing gas located at a lower part of the fluidizing bed 1, an inlet 5 for charging metal carbide powders located near and above the gas distributing plate 4, an outlet 6 for discharging a mixture of the burned or refined metal carbide powders and the combustion gas located above the fluidizing bed 1, and a collector 7 for recovering the product refined metal carbide powders connected to the outlet means 6.

It is essential that the fluidizing bed 1 consists of fluidized heat-resistant particles having an average particle diameter of 150-500$\mu$. When the average diameter of the heat-resistant particles is less than 150$\mu$, the heat-resistant particles rise too high and are overly scattered from the fluidizing bed 1 by the oxidizing gas and discharged from the upper outlet 6 and incorporated into the product refined metal carbide powders, deteriorating its quality. While, when the average diameter of the heat-resistant particles is more than 500$\mu$, bubbles of the oxidizing gas are liable to become coarse by agglomeration in the fluidizing bed 1, so that a uniform fluidizing state is difficult to produce.

A bed height at minimum fluidizing gas velocity of the fluidized heat-resistant particles constituting the fluidized bed 1 is preferably within a range of 0.2-3.0 m. When the bed height of the fluidized heat-resistant particles is less than 0.2 m, the residence time of the metal carbide powders in the fluidizing bed 1 becomes short and uneven, so that insufficiently burned free carbon is liable to be discharged. While, when the bed height is larger than 3.0 m, the residence time of the metal carbide powders in the fluidizing bed 1 becomes unnecessarily long, so that the loss of metal carbide powders due to oxidation becomes intolerably large and the pressure loss of the oxidizing gas becomes extremely large. Thus the pressure of the introduced oxidizing gas has to be increased in order to overcome the pressure loss, and hence the required capacity of a blower 8 becomes uneconomically large.

The refractory sealed vessel 2 has in its interior the fluidizing bed 1 consisting of the fluidized heat-resistant particles, so that the inner wall of the sealed vessel 2 suffers from severe abrasion of the fluidized heat-resistant particles. Therefore, it is advantageous to prepare the inner wall of the vessel 2 from a heat-resistant and abrasion-resistant material such as stainless steel or the like.

The gas distributing plate 4 for dispensing the supplied oxidizing gas has a function of uniformly distributing the oxidizing gas so as to fluidize the heat-resistant particles, and is preferably made of a heat-resistant and oxidation-resistive material such as a porous plate of stainless steel having uniformly spaced small holes, a porous refractory material or the like. In order to obtain a uniformly fluidized state, the gas distributing plate 4 has preferably small holes each having a diameter of not over than 5 mm and an opening ratio of crosssectional area of small holes to a crosssectional area of the sealed vessel within the range of about 0.1-1.0%.

It is important that the inlet 5 for charging metal carbide powders containing free carbon be arranged at the lowest possible position of the fluidizing bed 1, and it is necessary that the inlet 5 be arranged near above the gas distributing plate 4. This is because if the inlet 5 is arranged far above the gas distributing plate 4, the heat-resistant particles existing between the inlet 5 and the gas distributing plate 4 can no longer have the function of prolonging or uniformalizing the residence time of metal carbide powders in the fluidizing bed 1 and instead rather increases the pressure loss of the oxidizing gas unnecessarily.

The inlet 5 for charging the metal carbide powders is associated with a device for delivering the metal carbide powders. For example, it can be connected with a constant powder delivery device 9 through a duct 10. For the constant powder delivery device 9, a device is advantageously used that can continuously deliver the metal carbide powders at a constant rate or ratio, such as a rotary valve, table feeder, vibrating feeder or the like. Metal carbide powders delivered from the constant powder delivery device 9 are transported through the duct 10 by means of air and charged in the fluidizing bed 1.

The outlet 6 from which the burned metal carbide powders and the combustion gas are discharged must be arranged above the fluidizing bed 1. This is because the scattering of the metal carbide powders by the combustion gas from the fluidizing bed 1 consisting of the fluidized heat-resistant particles is important for separating the metal carbide powders from the fluidizing bed 1. If the outlet means 6 is not arranged above the fluidizing bed 1, the scattering and separation of the metal carbide powders from the fluidizing bed 1 consisting of the fluidized heat-resistant particles becomes difficult. Preferably, the outlet 6 is positioned sufficiently apart from the upper level surface of the fluidizing bed 1.

The metal carbide powders are discharged from the outlet 6 together with the combustion gas, so that a separator 7 for recovering and collecting the metal carbide powders has to be provided and connected to the outlet 6 through a duct 11. As the separator or collector 7, use is generally made of a device usually used for collecting fine powders. Particularly, a device having a high collection efficiency, such as an electric dust collector, a Venturi scrubber, a filter type dust collector or the like is preferable.

Figure 2:
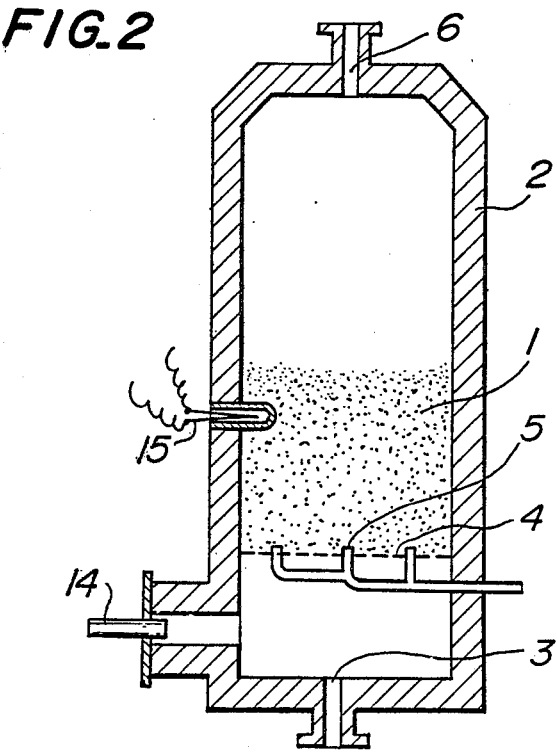
FIG. 2 is a diagrammatical longitudinal crosssection of a sealed vessel or column constituting a refining apparatus of the present invention used in Example 3 which will also be described later.

When burning and removing the free carbon contained in the metal carbide powders by maintaining the fluidizing bed 1 at a desired temperature, if the quantity of the free carbon contained in the metal carbide powders is relatively small, the desired temperature is difficult to maintain by the thermal energy obtained by combustion of the free carbon alone, so that an auxiliarly heating member 12, 13 or 14 for supplying an additional heat to the fluidizing bed 1 is preferably arranged in the apparatus of the present invention. As the auxiliary heating member for heating the fluidizing bed 1, use may be made of a heat exchanger 12 for recovering a sensible heat of the combustion gas and for preheating the oxidizing gas, an electric resistive heat generator 13, as shown in FIG. 1, a burner 14 for burning a liquid fuel such as light oil, heavy oil, etc., or a gaseous fuel such as propane, natural gas, city gas, etc., as shown in FIG. 2 and the like means. For measuring the temperature of the fluidizing bed 1, there is incorporated in the fluidizing bed 1 a temperature measuring element 15 such as a thermocouple.

In operating the apparatus of the present invention, metal carbide powder containing free carbon, delivered by the constant material delivery device 9, is transferred by a pneumatic conveyor and charged from the inlet 5 into the fluidizing bed 1 near the gas dispersing plate 4. During the rise of the powder in the fluidizing bed 1 consisting of the fluidized heat-resistant particles, the free carbon contained therein is burned and removed. The residence time of metal carbide powder in the fluidizing bed is controlled by adjusting the bed height and the superficial velocity of the oxidizing gas. The reaction temperature is maintained in the determined range, for example, by using at least one of various types of the auxiliary heating members 12, 13 and 14. As a result, burned or refined metal carbide powder is floated in the fluidizing bed 1 consisting of the fluidized heat-resistant particles and scattered and separated from the fluidizing bed 1. It is subsequently discharged together with the combustion gas from the outlet 6 arranged above the fluidizing bed 1, and then recovered by the separator 7.

Hereinafter, the present invention will be explained in more detail with reference to preferred Examples which, however, should not be construed in any means as limitations of the present invention.

In the Examples, all percentages shown are by weight basis unless otherwise specified.

EXAMPLE 1

A fluidizing bed is formed by using air as the oxidizing gas at a superficial gas velocity of 20 cm/sec and silica particles having particle diameters of 177–250$\mu$ as heat-resistant particles, while fixing the bed height at minimum fluidizing gas velocity of 1.0 m of the fluidizing bed. Silicon carbide powders containing 19.4% of free carbon and having an average grain size of 83$\mu$ are charged at a rate of 20 g per minute and the refining reaction is operated continuously at a reaction temperature of 950° C. The apparatus used is the same as shown in FIG. 1, having an electric heater for heating the fluidizing bed around its exterior wall. The inner diameter of the sealed vessel is 0.2 m and the height from the gas distributor to the outlet is 2.0 m.

Silicon carbide powders recovered in a bag filter contains 0.21% of free carbon and loss of silicon carbide powders due to oxidation is 0.8%. Incorporation of silica particles into the silicon carbide is to an undetectable extent. A portion of the heat-resistant particles removed as a sample for analysis after a continuous operation of 2 hours shows that no silicon carbide powder remains in the fluidizing bed consisting of the heat-resistant particles.

EXAMPLE 2 AND COMPARATIVE EXAMPLE 1

The operation of Example 1 is repeated using the same material and apparatus as those of Example 1, except that the reaction temperatures are varied. The results are shown in the following Table 1.

TABLE 1

|  |  | Reaction temperature (°C.) | Free carbon in product (%) | Loss of silicon carbide due to oxidation (%) |
|---|---|---|---|---|
| Examples | 1 | 950 | 0.21 | 0.8 |
|  | 2-1 | 850 | 0.66 | 0.2 |
|  | 2-2 | 1050 | 0.08 | 1.4 |
| Comparative | 1-1 | 700 | 4.21 | 0.1 |
| Examples | 1-2 | 1200 | 0.05 | 5.6 |

As seen from the above Table 1, free carbon can be burned and removed stably and efficiently for a long period of time in the Examples 1 and 2 according to the present invention. On the contrary, when operated at a low reaction temperature as shown in the comparative Example 1—1, the product still contains a lot of free carbon owing to discharge and incorporation of unreacted free carbon into the product. While, when operated at a high reaction temperature as shown in the comparative Example 1-2, free carbon remaining in the product can be decreased, whereas oxidation speed of silicon carbide powders increases remarkably, so that the loss of silicon carbide powders increases due to oxidation.

COMPARATIVE EXAMPLE 2

A heater built-in type rotary furnace having an inner diameter size of 0.5 m, a length of 0.6 m and a heating member consisting of electric-resistive heating rods at its central portion is heated to a temperature of 750° C. while rotating at a rate of 1 rpm. 10 kg of the material used in Example 1 is charged in the rotary furnace to burn free carbon contained therein while supplying air at a rate of 400 l/min.

Silicon carbide powders after burning of 7 hours contain 1.4% of free carbon and loss of silicon carbide powders due to oxidation is 2.5%. Besides, it is found out that some silicon carbide powders are granulated and free carbon is contained or incorporated in the granules.

As mentioned above, a rotary furnace cannot remove free carbon efficiently, so that it is not suited for a practical purpose.

COMPARATIVE EXAMPLE 3

Figure 3:
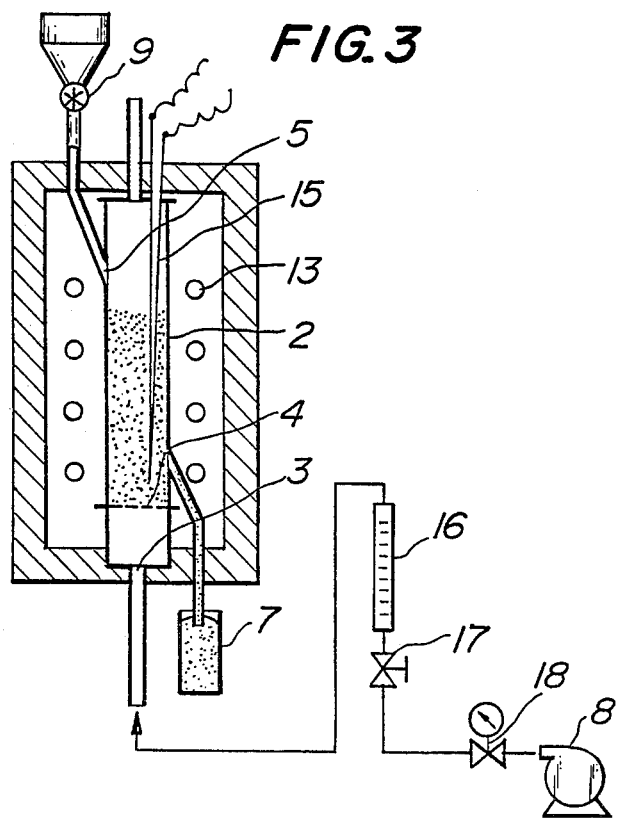
FIG. 3 is a diagrammatical graph illustrating an apparatus of a fluidizing bed used in Comparative Example 3 which will also be described later.

120 g of the material same as that used in Example 1 is charged in a fluidizing bed having a crosssectional area of 50 cm² and a height of 50 cm in a sealed vessel of a structure as shown in FIG. 3, and heated to a temperature of 850° C. and fluidized by using air as an oxidizing gas at a superficial gas velocity of 5 cm/sec. The refining process is operated while charging the material at a rate of 3 g/sec using a rotary feeder. The average residence time of the material in the container is approximately 40 min.

Recovered silicon carbide powders contain 5.21% of free carbon and a loss of silicon carbide due to oxidation is 4.1%.

In the run of the Comparative Example 3, it is observed that after a while from initiation of the fluidization, some of the silicon carbide powders have been agglomerated at several portions of the fluidizing bed whereby a strong deflection of flow has been formed. Meanwhile, it is found out that, if the superficial gas velocity is so increased as to solve the above deflection of flow, a large amount of fine particles are scattered and discharged from the gas discharge outlet arranged at the upper portion of the sealed vessel. Thus, it is extremely difficult to remove free carbon by a mere fluidization of silicon carbide powders.

EXAMPLE 3

In an apparatus having the same structure as shown in FIG. 2 according to the invention comprising a sealed vessel having an inner diameter of 1.2 m and a height of 2.5 m from the gas distributor to the outlet, a fluidizing bed is produced by using silica particles having diameters of 177–250μ as heat-resistant particles and air as an oxidizing gas for fluidization at a superficial gas velocity of 25 cm/sec, while fixing a bed height at minimum fluidizing gas velocity of 1.4 m of the fluidizing bed. In the fluidizing bed is charged the same material as that used in Example 1 at a rate of 0.6 kg/min, and the refining operation is conducted for a long period of time at a reaction temperature of 900° C. The reaction temperature is maintained by burning a light oil from a burner.

Silicon carbide powders collected by a bag filter contain 0.26–0.32% of free carbon and loss of silicon carbide due to oxidation is 0.7–0.9%. Silicon carbide powders of highly refined quality can be stably obtained in a great quantity.

EXAMPLE 4

Titanium carbide powders containing 4.3% of free carbon and having an average grain size of 68μ are charged at a rate of 30 g/min into a fluidizing bed produced by fluidizing heat-resistant alumina particles having particle diameters of 177–250μ by means of air as an oxidizing gas for fluidization at a superficial gas velocity of 30 cm/sec, and the refining operation is performed continuously at a reaction temperature of 900° C. The apparatus used is the same as that used in Example 1.

Titanium carbide powders recovered by a bag filter contain 0.12% of free carbon and loss of titanium carbide due to oxidation is 1.2%. Incorporation of alumina particles in titanium carbide powders and titanium carbide powders remaining in the fluidization bed are both to undetectable extents.

As apparent from the above explanation, according to the refining method and apparatus of the present invention, free carbon contained in various types of metal carbides which heretofore has been difficult to refine is burned and removed extremely efficiently without causing oxidation of metal carbide powders, so that loss of metal carbide powders due to oxidation can substantially be obviated. Moreover, metal carbide powders can be treated in a great quantity in an industrial scale and produced at high quality, so that the present invention is exceedingly useful industrially.

Although the present invention has been explained with reference to specific values and embodiments, it will of course be apparent to those skilled in the art that the present invention is not limited thereto and many variations and modifications are possible without departing from the broad aspect and scope of the present invention as defined in the appended claims.

What is claimed is:

1. An apparatus for refining metal carbide powders containing free carbon and having an average grain size of not more than 200 microns without substantial oxidation of the metal carbides, comprising a sealed vessel containing a fluidizing bed with a bed height at minimum fluidizing gas velocity within a range of 0.2–3.0 m consisting of heat-resistant particles having an average particle diameter of 150–500μ fluidized by an oxidizing gas, an inlet for introducing the oxidizing gas arranged at the lower end of the sealed vessel, a gas distributor which is a plate of porous heat-resistant and oxidation-resistant material having uniformly spaced small holes each having a diameter of not more than 5 mm and an opening ratio of cross-sectional area of the small holes to cross-sectional area of the sealed vessel within a range of 0.1–10% for dispersing the oxidizing gas in the fluidizing bed arranged at a lower part of the fluidizing bed, an inlet for charging the metal carbide powders which discharges substantially upwardly in immediate proximity to the gas distributor and is so arranged as to ensure generally even distribution of the metal carbide powders in the fluidizing bed, a heating member for heating the fluidizing bed arranged in the refining apparatus to a temperature of 800°–1100° C. to burn and remove the free carbon from the metal carbide powders, an outlet for discharging a mixture of refined metal carbide powders and combustion gas from the fluidizing bed arranged above the fluidizing bed, and a separator for recovering the refined metal carbide powders from the mixture discharged from the outlet.

2. An apparatus as defined in claim 1, wherein a bubbles-dispersing element for improving efficiency of contacting the free carbon with the oxidizing gas in the fluidizing bed is arranged in the fluidizing bed.

* * * * *